(12) United States Patent
Wang (10) Patent No.: US 10,865,022 B2
(45) Date of Patent: Dec. 15, 2020

(54) SEAL BOTTLE ASSEMBLY (71) Applicant: Jui-Te Wang, Taichung (TW)

(72) Inventor: Jui-Te Wang, Taichung (TW)

(73) Assignees: Jui-Te Wang, Taichung (TW); Jordan S. Tarlow, Venice, CA (US)

( * ) Notice: Subject to any disclaimer, the term of this patent is extended or adjusted under 35 U.S.C. 154(b) by 41 days.

(21) Appl. No.: 16/279,988

(22) Filed: Feb. 19, 2019

(65) Prior Publication Data
US 2020/0262623 A1 Aug. 20, 2020

(51) Int. Cl.
B65D 51/16 (2006.01)
F16K 1/12 (2006.01)
F16K 5/04 (2006.01)

(52) U.S. Cl.
CPC ............ B65D 51/1683 (2013.01); F16K 1/12 (2013.01); F16K 5/0407 (2013.01); *B65D 2205/00* (2013.01)

(58) Field of Classification Search
CPC ........................ B65D 51/1683; B65D 51/1672; B65D 51/16; B65D 2205/00; B65D 2205/02; B65D 2205/04; F16K 5/0407; F16K 5/0421; F16K 5/0442; F16K 1/12; F16K 17/19
See application file for complete search history.

(56) References Cited

U.S. PATENT DOCUMENTS

| 5,697,510 A * | 12/1997 | Wang | B65D 51/1683 215/262 |
| 2015/0136770 A1* | 5/2015 | Wang | A47J 47/06 220/203.22 |
| 2017/0197768 A1* | 7/2017 | Wang | B65D 51/1683 |

* cited by examiner

*Primary Examiner* — Don M Anderson (57) ABSTRACT

A seal bottle assembly includes a bottle and a cap is removably mounted to the top opening of the bottle to seal the first room. The cap includes a radial hole defined radially therethrough. A switch unit includes a seal part located in the cap, and a control part located outside of the cap. When the control part is pushed toward the seal part, the pressure in the cap and the bottle is the same as that of outside of the bottle assembly so that the cap is removable relative to the bottle. When the control part is pulled away from the seal part and the seal part is moved to seal a communication between the first and second rooms. The pressure in the cap and the bottle is different from that of outside of the bottle assembly so that the cap is not removable relative to the bottle.

8 Claims, 15 Drawing Sheets

SEAL BOTTLE ASSEMBLY

BACKGROUND OF THE INVENTION

1. Fields of the Invention

The present invention relates to a bottle with a seal cap, and more particularly, to a seal cap that adjusts the pressure between interior and exterior of the bottle to seal the bottle or to remove the cap from the bottle.

2. Descriptions of Related Art

There are different bottles, jars, containers or the like used in everyday life such as the juice bottles, spice jars and pharmaceutical containers, and these bottles, jars and containers are required to be properly sealed to keep fresh of the juice, spice and pills stored therein. Furthermore, these caps are designed to prevent kids from touching the medicine or pills. Most of the seal caps uses mechanical ways to prevent the cap from being opened easily, but air can still be introduced into the bottles without restriction.

The present invention intends to provide a seal bottle assembly that includes a seal cap which is cooperated with a control part and a seal part to adjust the pressure between interior and exterior of the bottle.

SUMMARY OF THE INVENTION

The present invention relates to a seal bottle assembly and comprises a bottle having a top opening. A first room is defined in the bottle and communicates with the top opening. A cap is removably mounted to the top opening of the bottle to seal the first room. The cap includes a second room defined therein. A radial hole is defined radially through the cap and communicates with the second room. The radial hole includes a first opening located at the inner periphery of the cap, and a second opening located at the outer periphery of the cap. A restriction ring extends radially and inward from the inner periphery of the first opening of the radial hole. The restriction ring includes multiple protrusion protruding from the inner periphery thereof. Multiple recesses are defined in the inner periphery of the restriction ring. Multiple blocks extend from the inner periphery of the radial hole.

A switch unit includes a seal part and a control part. The control part includes two stop plates and a tube extending from the inner side thereof, wherein the stop plates are located around the tube. A communication path is defined between the tube and the stop plates. The stop plates and the tube of the control part are inserted into the radial hole from the second opening of the outer periphery of the cap. The control part includes at least one notch defined radially in an outer periphery thereof, the at least one notch communicates with the radial hole. The seal part includes a tongue that is inserted into the radial hole from the first opening of the inner periphery of the cap. The tongue is engaged with the tube.

When the control part is pushed toward the seal part, the two stop plates contact the restriction ring, and the tube pushes the seal part toward the second room. The first room, the second room, the recesses, the radial hole and the at least one notch are in communication with each other. The pressure in the first and second rooms is the same as that of outside of the bottle assembly so that the cap is removable relative to the bottle.

When the control part is pulled away from the seal part and the seal part is moved to seal a communication between the first and second rooms, the pressure in the first and second rooms is different from that of outside of the bottle assembly so that the cap is not removable relative to the bottle.

When the control part is rotated within the radial hole, the two stop plates contact the blocks to restrict the control part from being pushed toward the seal part.

The primary object of the present invention is to provide a seal bottle assembly wherein the users simply push the control part inward, the cap can be easily separated from the bottle. On the contrary, when the control part is pulled outward, the cap seals the top opening of the bottle, and the cap is not separated from the bottle due to pressure difference. Besides, the cap cannot be unintentionally pushed inward when the cap is rotated to let the two stop plates contact the blocks. The safety feature prevents kids from opening the cap.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the seal bottle assembly of the present invention comprises a cylindrical bottle 1 and a cap 2, wherein the bottle 1 includes a top opening, and a first room 11 is defined in the bottle 1 and communicates with the top opening. The cap 2 is removably mounted to the top opening of the bottle 1 to seal the first room 11. The cap 2 includes a second room 21 defined therein. A protruded portion 3 extends radially and inward from the inner periphery of the second room 21. A radial hole 31 is defined radially through the protruded portion 3 of the cap 2 and communicates with the second room 21. The radial hole 31 includes multiple air paths 22 defined radially therethrough which open through the top of the cap 2. The radial hole 31 includes a first opening located at the inner periphery of the cap 2, and a second opening located at the outer periphery of the cap 2. A restriction ring 4 extends radially and inward from the inner periphery of the first opening of the radial hole 31. The restriction ring 4 includes multiple protrusion 41 protruding from the inner periphery thereof, and multiple recesses 42 are defined in the inner periphery of the restriction ring 4. Multiple blocks 311 extend from the inner periphery of the radial hole 31.

A switch unit 5 includes a seal part 51 and a control part 52. The control part 52 includes two stop plates 521 and a tube 522 extending from the inner side thereof, wherein the stop plates 521 are located around the tube 522. A communication path 523 is defined between the tube 522 and the stop plates 521. The tube 522 of the control part 52 includes a central passage 525, and two windows 526 are defined through the wall of the tube 522 and communicate with the central passage 525. The stop plates 521 and the tube 522 of the control part 52 are inserted into the radial hole 31 from the second opening of the outer periphery of the cap 2. The control part 52 includes at least one notch 524 defined radially in the outer periphery thereof, wherein the at least one notch 524 communicates with the radial hole 31.

The seal part 51 includes an end plate 511 and a tongue 512 extends from one side of the end plate 511. The tongue 512 is inserted into the radial hole 31 from the first opening of the inner periphery of the cap 2. The diameter of the end plate 511 is larger than that of the first opening of the radial hole 31 so that the end plate 511 is not inserted into the radial hole 31. The tongue 512 includes two lugs 512A and each lug 512A includes a lateral portion 512B protruding laterally therefrom. The two lugs 512A can be squeezed inward and the lateral portions 512B are engaged with the windows 526 when the tongue 512 is inserted into the central passage 525 of the tube 522. By this way, the seal part 51 is connected to the control part 52.

Referring to FIGS. 3, 6, 6A, 6B, 6C, 7 and 7A, when the control part 52 is pushed toward the seal part 51, the two stop plates 521 contact the restriction ring 4, the tube 522 pushes the seal part 51 toward the second room 21. Therefore, the first room 11, the second room 21, the recesses 42, the radial hole 31 and the at least one notch 524 are in communication with each other. The pressure in the first and second rooms 11, 21 is the same as that of outside of the bottle assembly so that the cap 2 is removable relative to the bottle 1.

When the control part 52 is pulled away from the seal part 51 and the seal part 51 is moved to seal the communication between the first and second rooms 11, 21. The pressure in the first and second rooms 11, 21 is different from that of outside of the bottle assembly so that the cap 2 is not removable relative to the bottle 1. Besides, as shown in FIGS. 8 to 11, when the control part 52 is rotated within the radial hole 31, the two stop plates 521 contact the blocks 311 to restrict the control part 52 from being pushed toward the seal part 51.

The users simply push the control part 52 inward, the cap 2 can be easily separated from the bottle 1. On the contrary, when the control part 52 is pulled outward, the cap 2 seals the top opening of the bottle 1, and the cap 2 is not separated from the bottle due to pressure difference. The control unit 5 also provides a safety feature which is that the cap 2 cannot be unintentionally pushed inward to open the bottle 1 when the cap 2 is rotated to let the two stop plates 521 contact the blocks 311. The safety feature prevents kids from opening the cap 2.

In order to allow the users to be acknowledged when the control part 52 is rotated to a proper position to lock the switch unit 5, each of the blocks 311 is an L-shaped block and includes a first restriction portion 311A and a second restriction portion 311B, wherein the first restriction portion 311A is perpendicular to the second restriction portion 311B corresponding thereto. The first restriction portion 311A of each block 311 includes an inclined face 311C formed on a corner at the distal end thereof. The inclined face 311C of each block 311 guides one of the stop plates 521 to contact the first restriction portion 311A and the second restriction portion 311B. The inclined face 311C of each block 311 also prevents the corner of the stop plate 521 from being stopped by the first restriction portion 311A. The second restriction portion 311B of each block 311 restricts rotation of the stop plate 521 corresponding thereto.

In order to allow the users to repeatedly push the control part 52, as shown in FIGS. 8 to 11, a spring 6 is mounted to the outside of the tube 522 and located in the communication path 523. The spring 6 is biased between the control part 52 and the protrusions 41, such that the spring 6 provides a force to return the control part 52 after the control part 52 is pushed.

Figure 1:
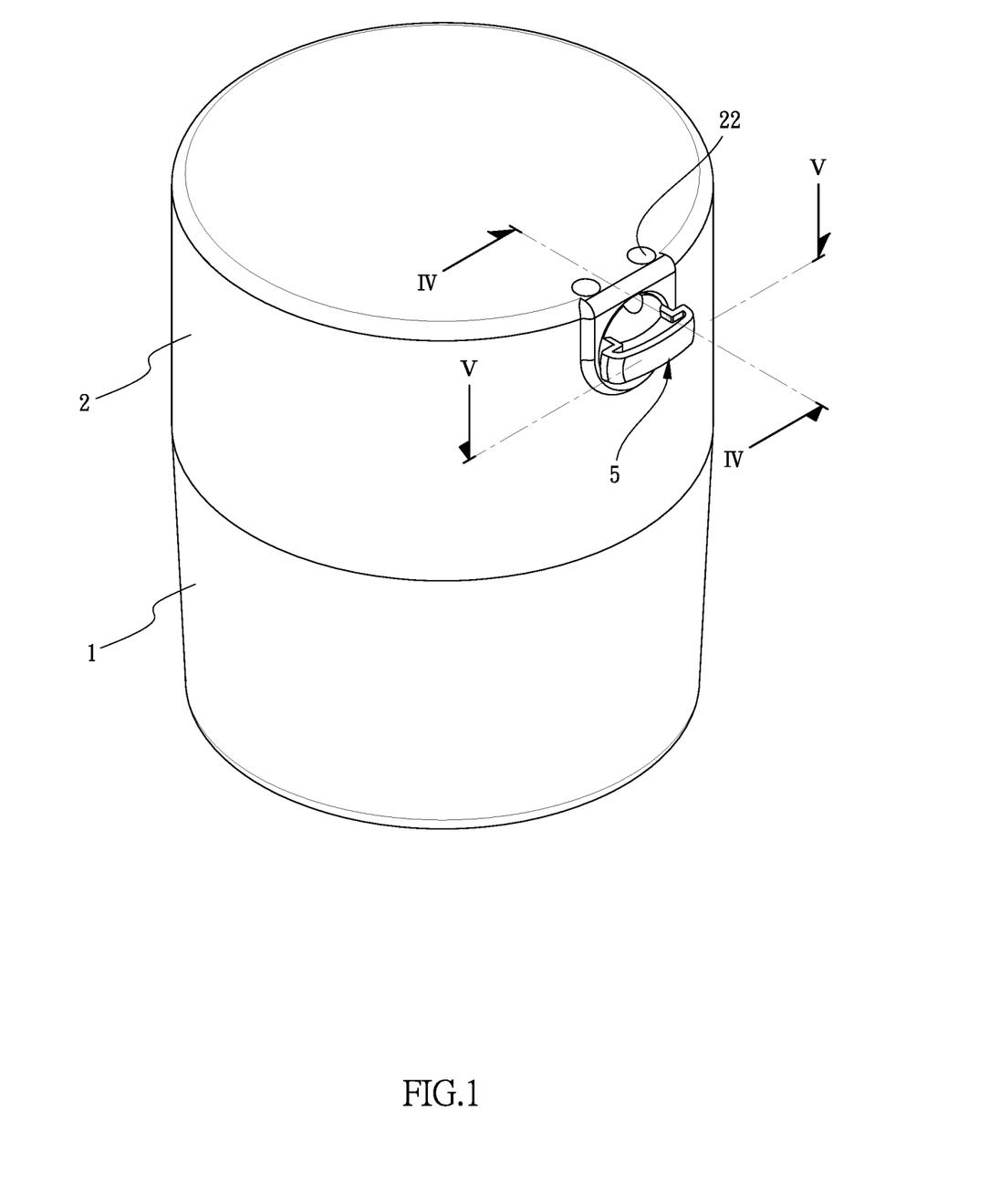
FIG. 1 is a perspective view to show the seal bottle assembly of the present invention, wherein the cap is mounted to the bottle.
Figure 2:
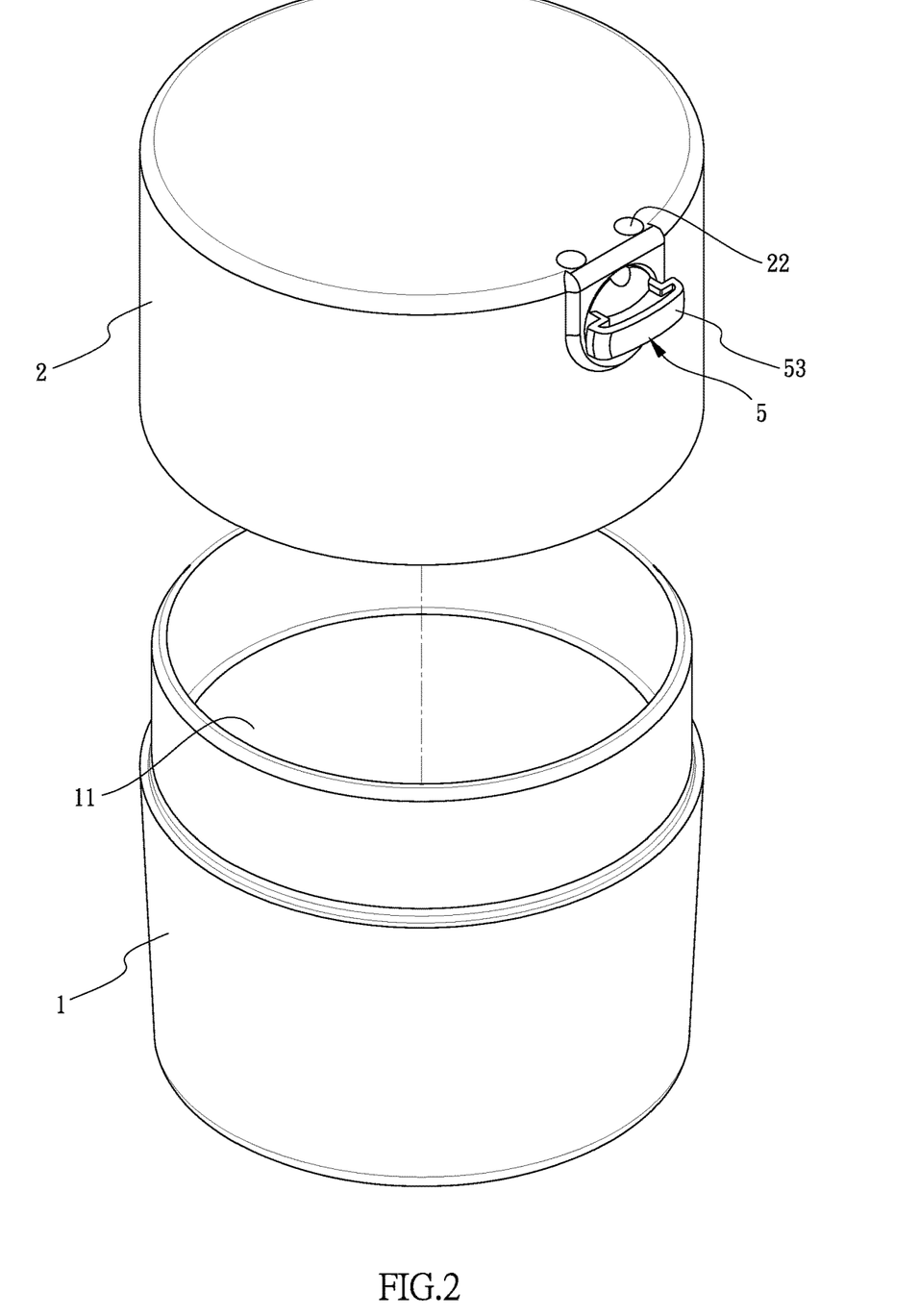
FIG. 2 is a perspective view to show the seal bottle assembly of the present invention, wherein the cap is separated from the bottle.
Figure 3:
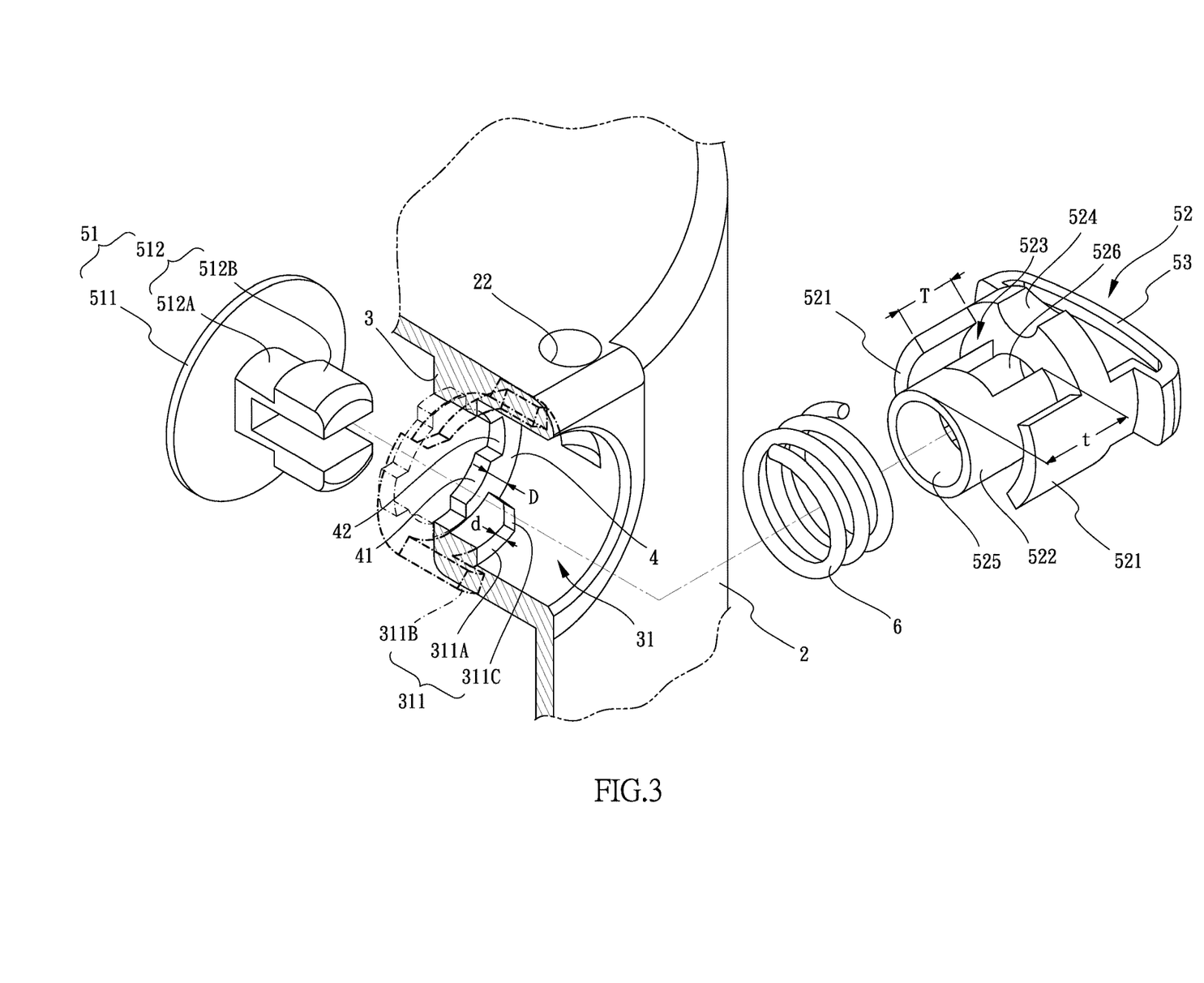
FIG. 3 is an exploded view of the control unit of the seal bottle assembly of the present invention.
Figure 4:
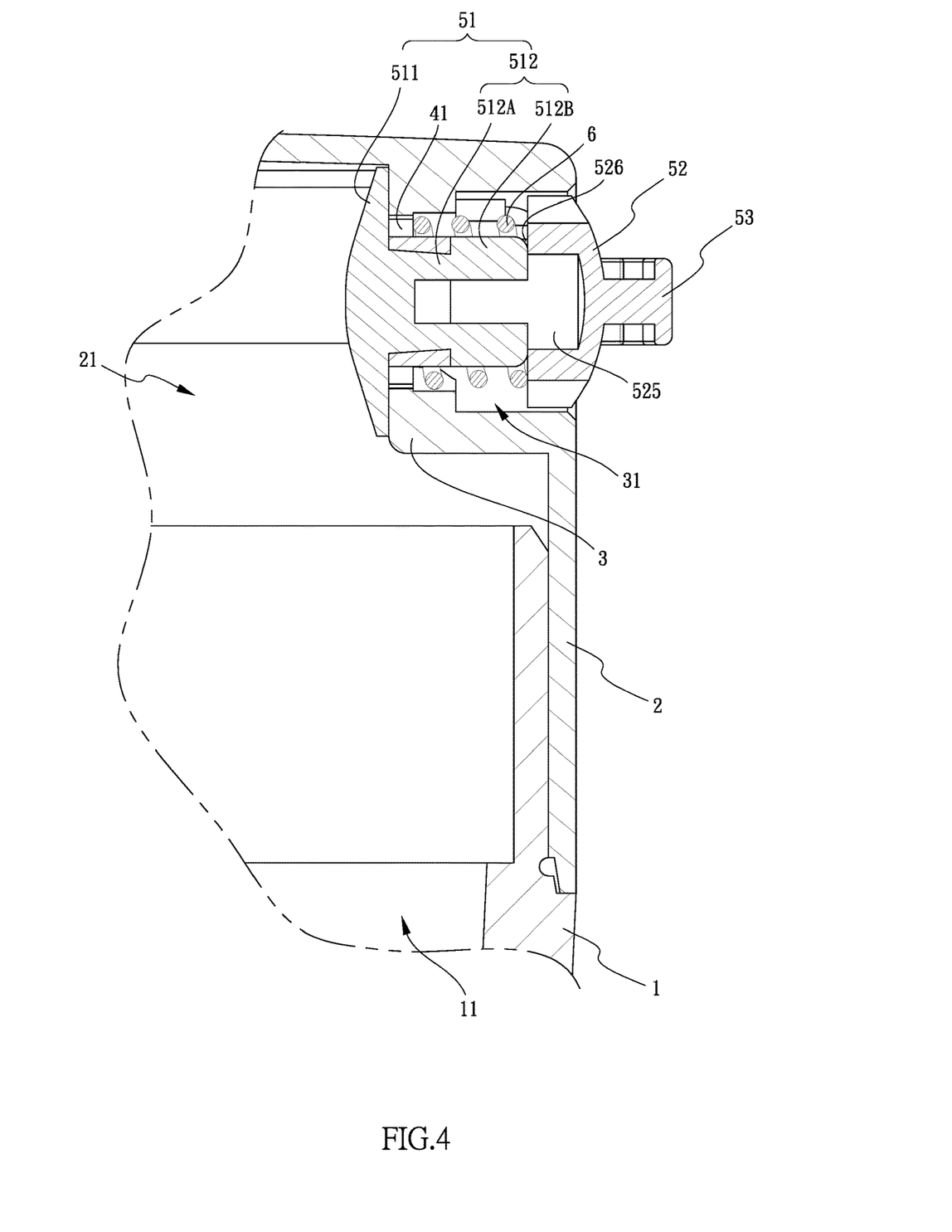
FIG. 4 is a cross sectional view, taken along line IV-IV of FIG. 1.
Figure 5:
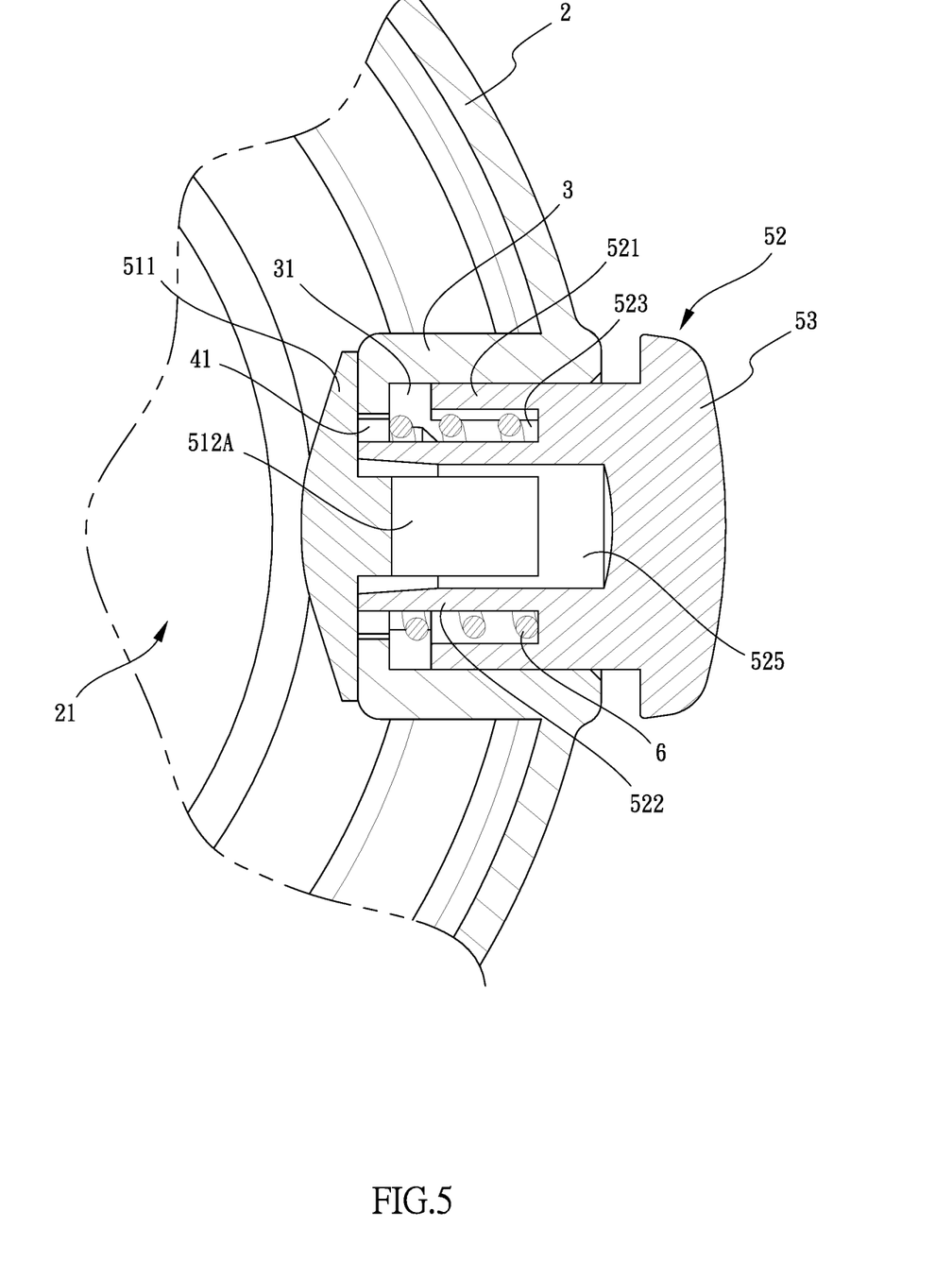
FIG. 5 is a cross sectional view, taken along line V-V of FIG. 1.
Figure 6:
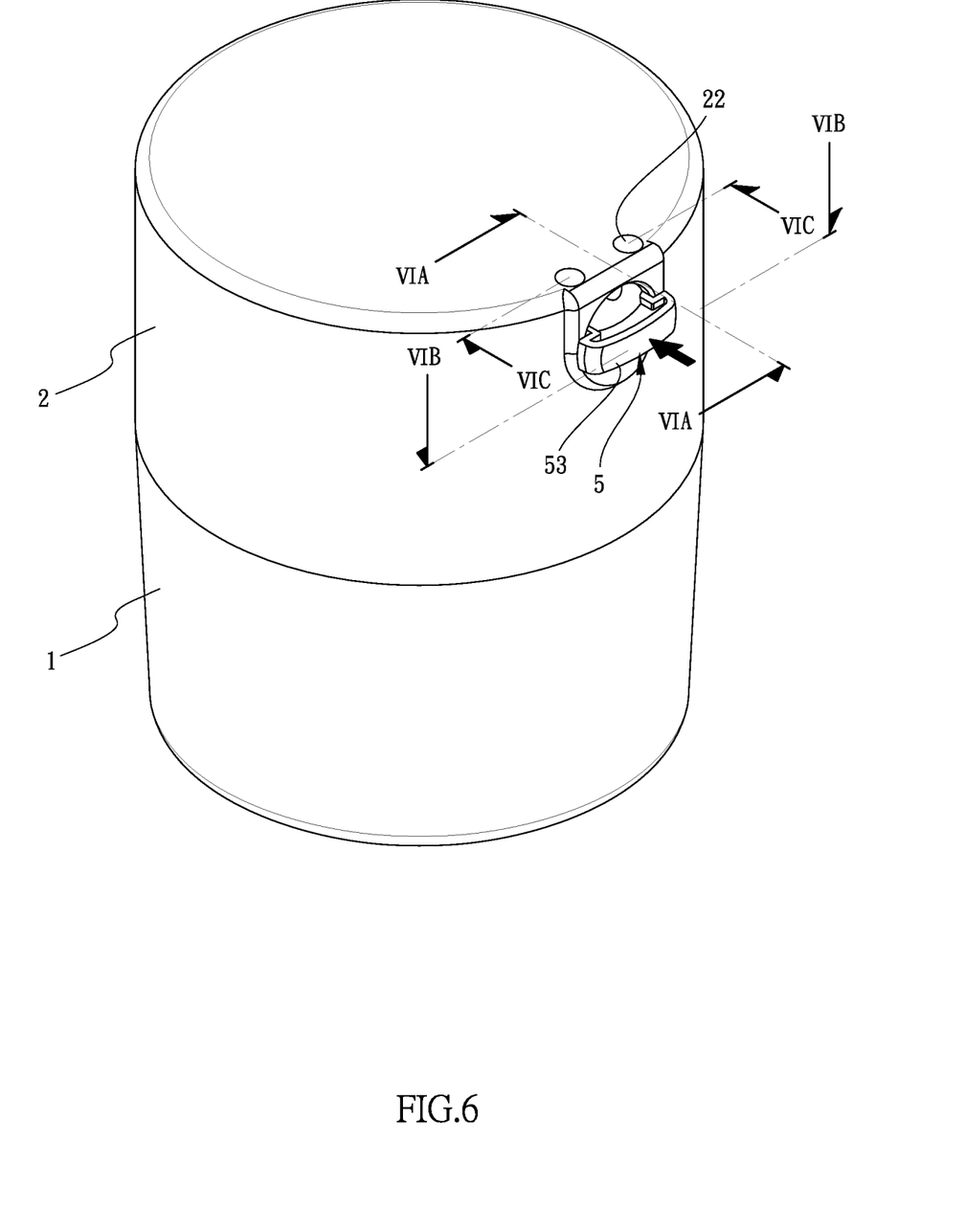
FIG. 6 shows that the control part is pushed inward.
Figure 6A:
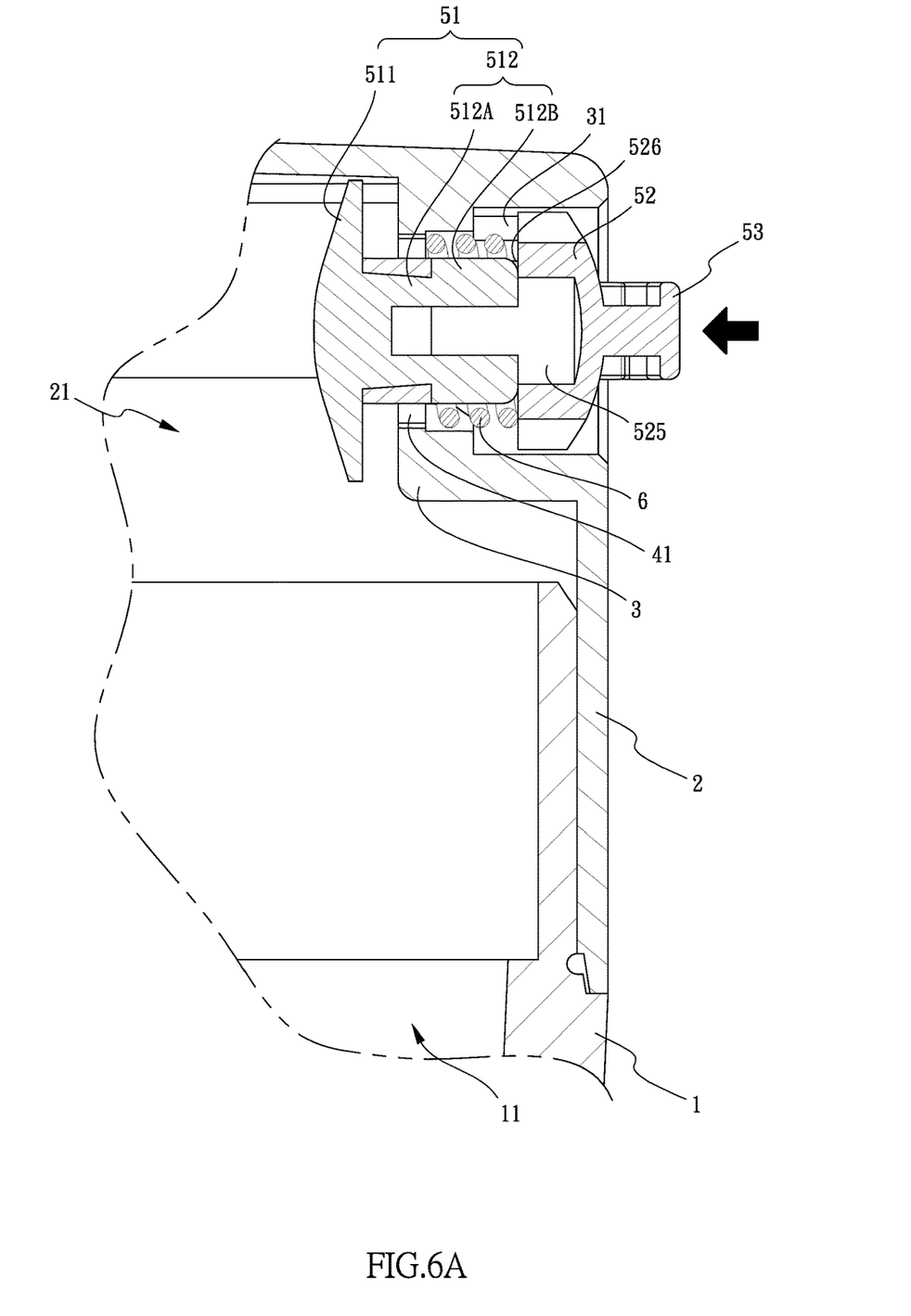
FIG. 6A is a cross sectional view, taken along line VIA-VIA of FIG. 6.
Figure 6B:
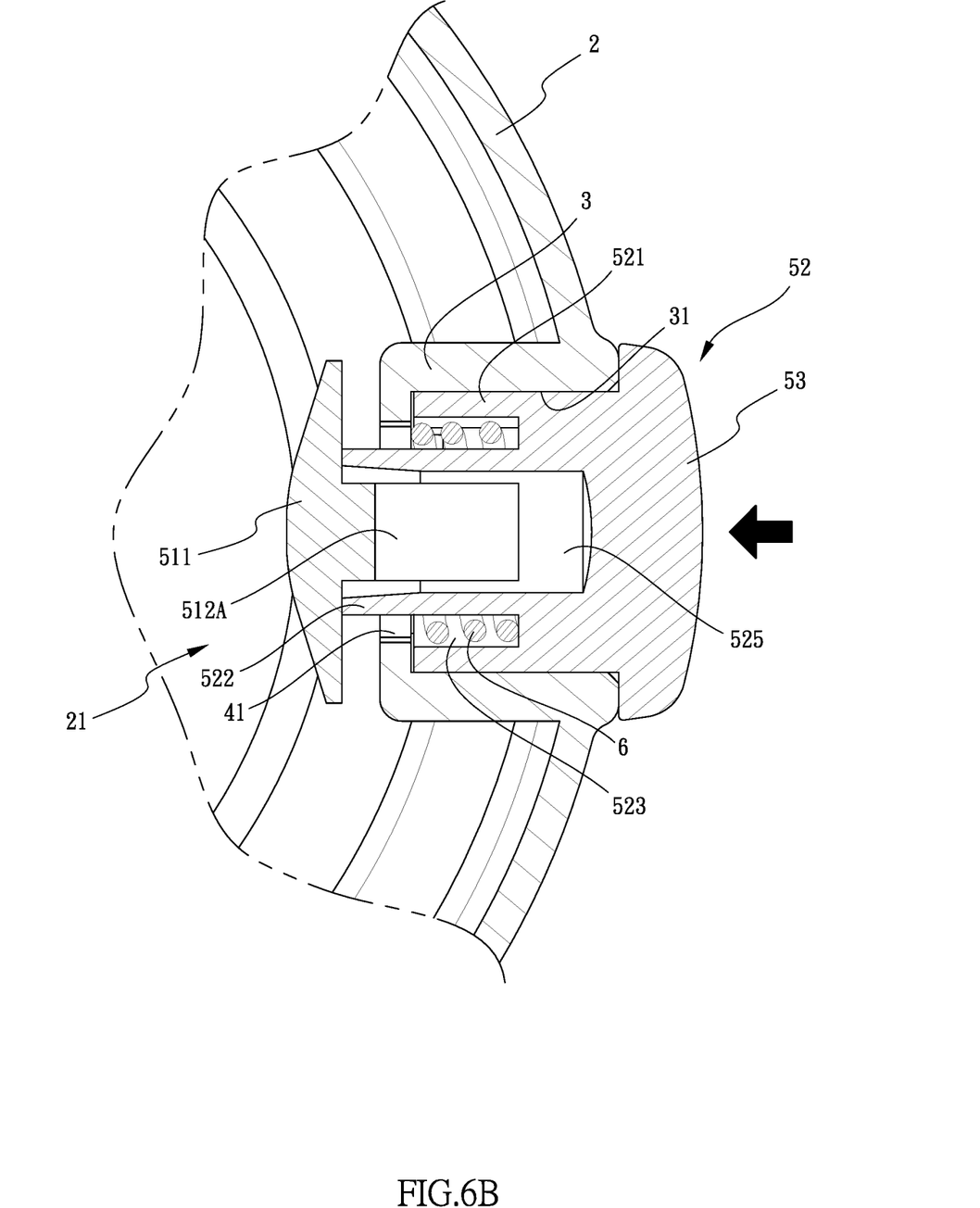
FIG. 6B is a cross sectional view, taken along line VIB-VIB of FIG. 6.
Figure 6C:
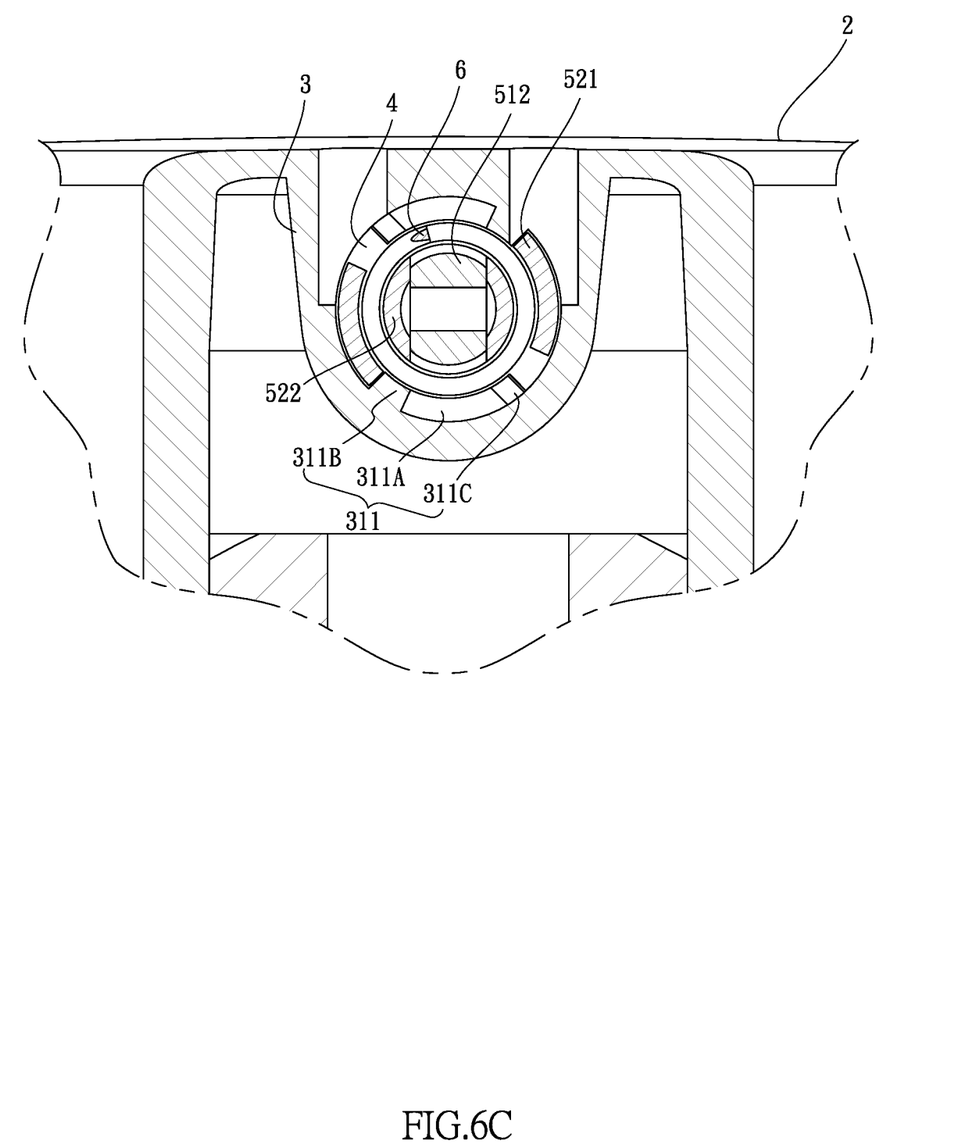
FIG. 6C is a cross sectional view, taken along line VIC-VIC of FIG. 6.
Figure 7:
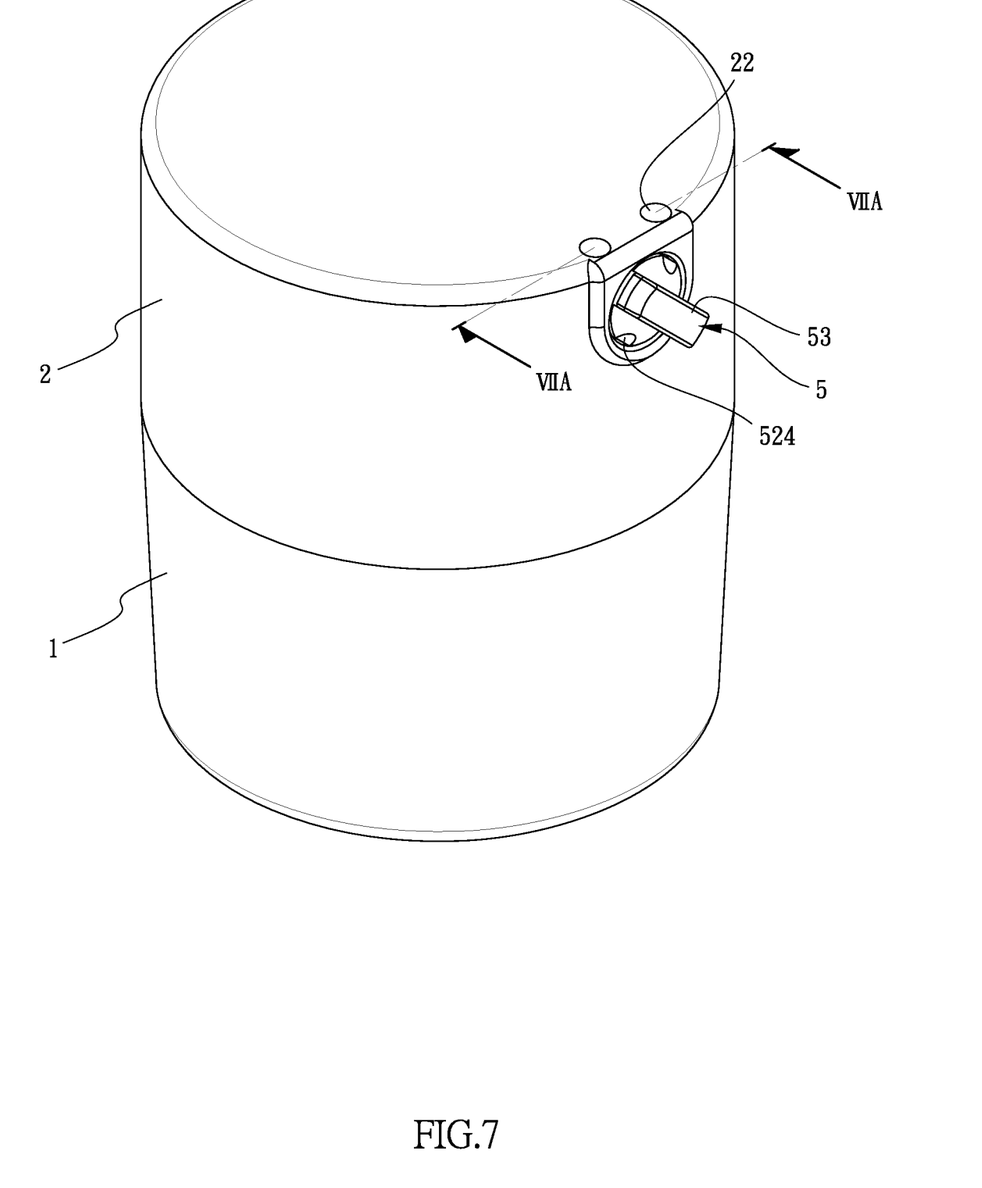
FIG. 7 shows that the control part is rotated an angle.
Figure 7A:
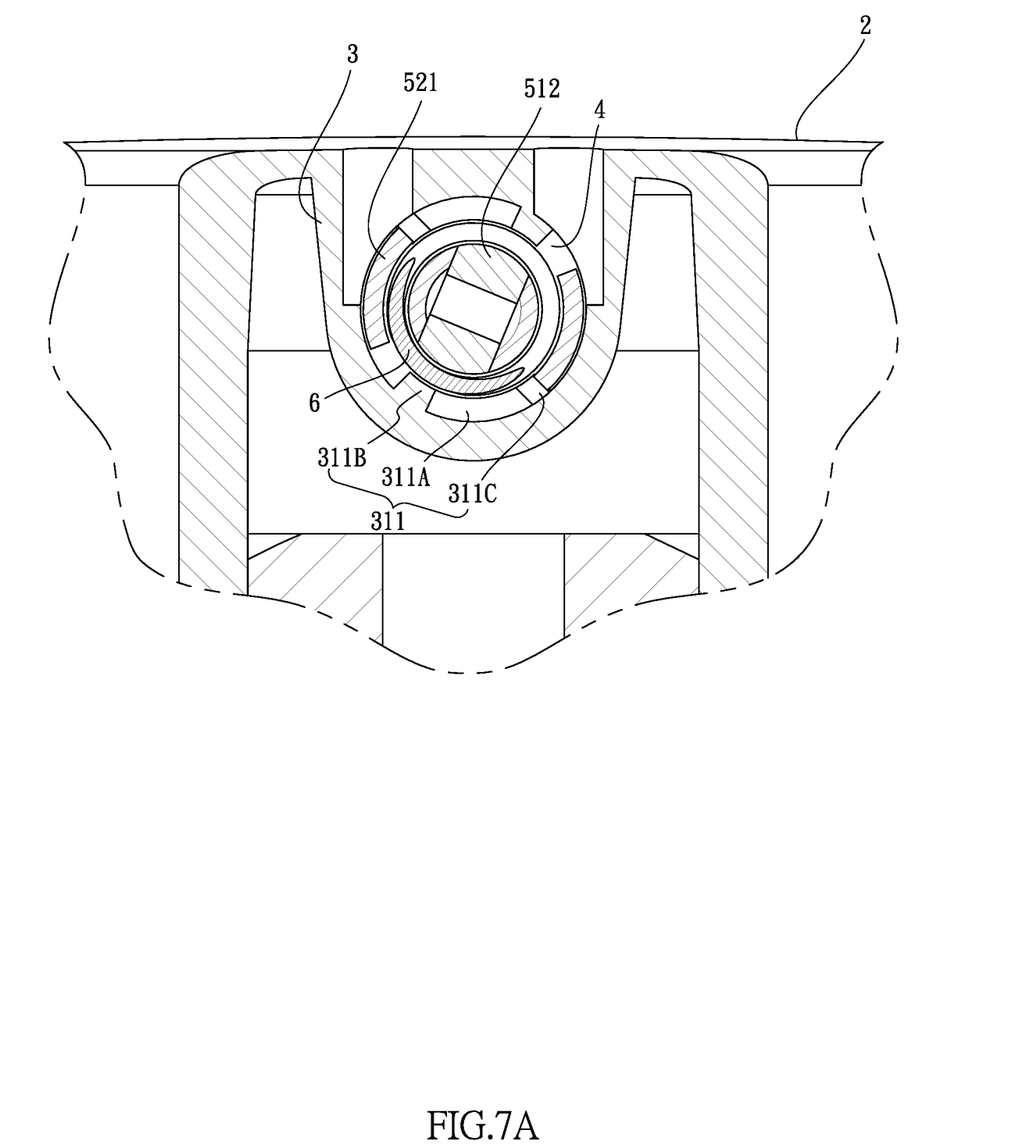
FIG. 7A is a cross sectional view, taken along line VIIA-VIIA of FIG. 7.
Figure 8:
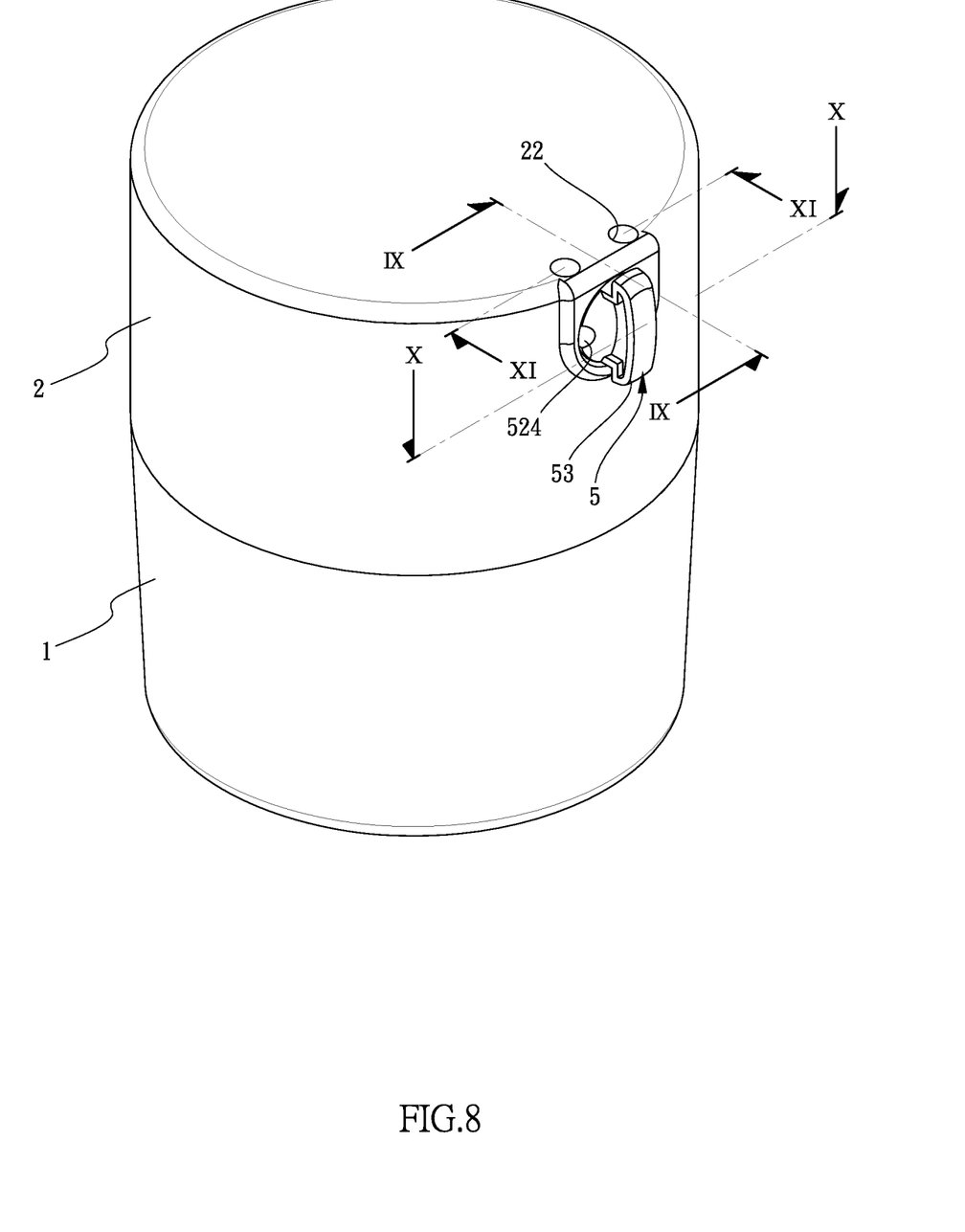
FIG. 8 shows that the control part is rotated and locked.
Figure 9:
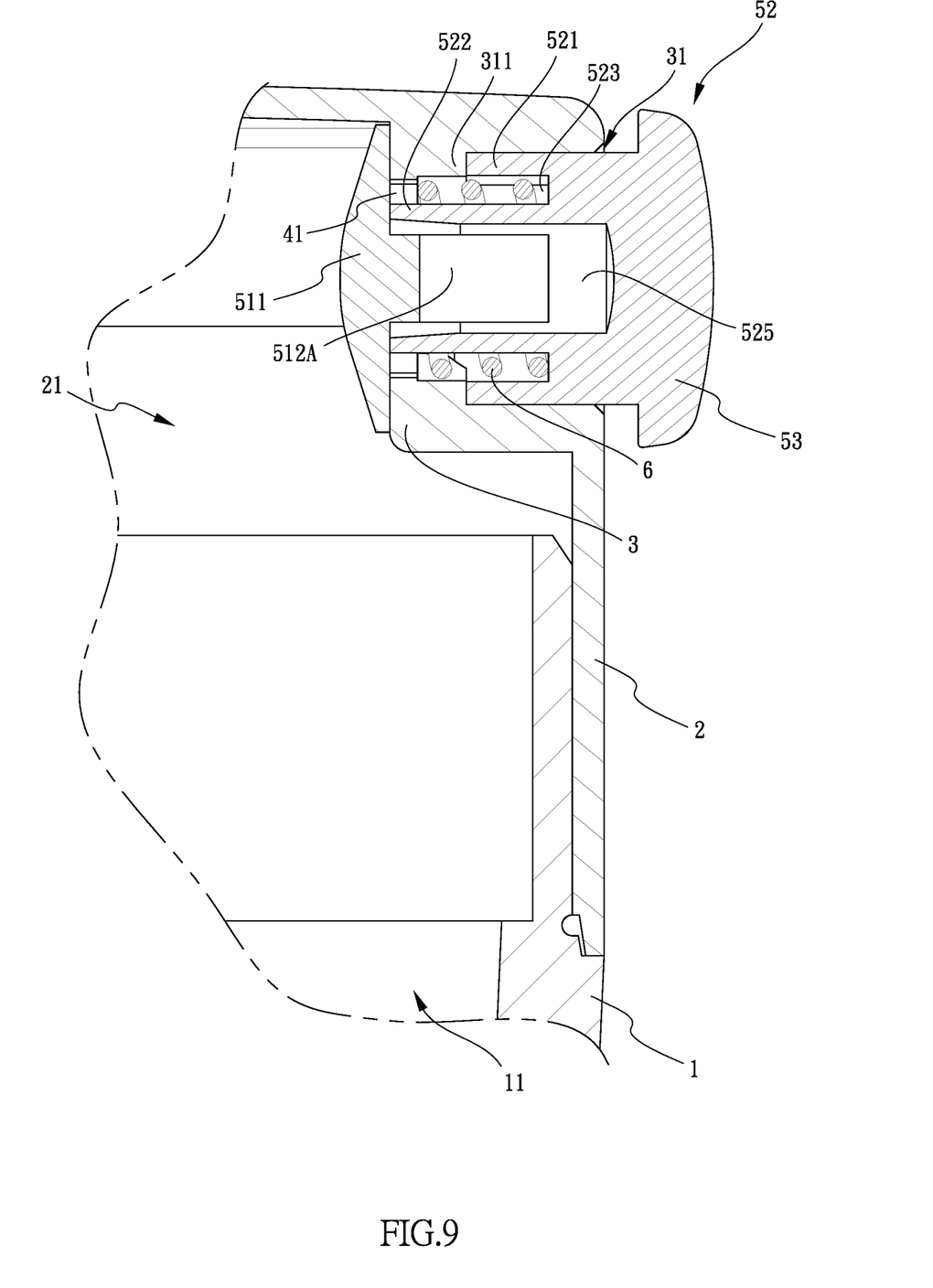
FIG. 9 is a cross sectional view, taken along line IX-IX of FIG. 8.
Figure 10:
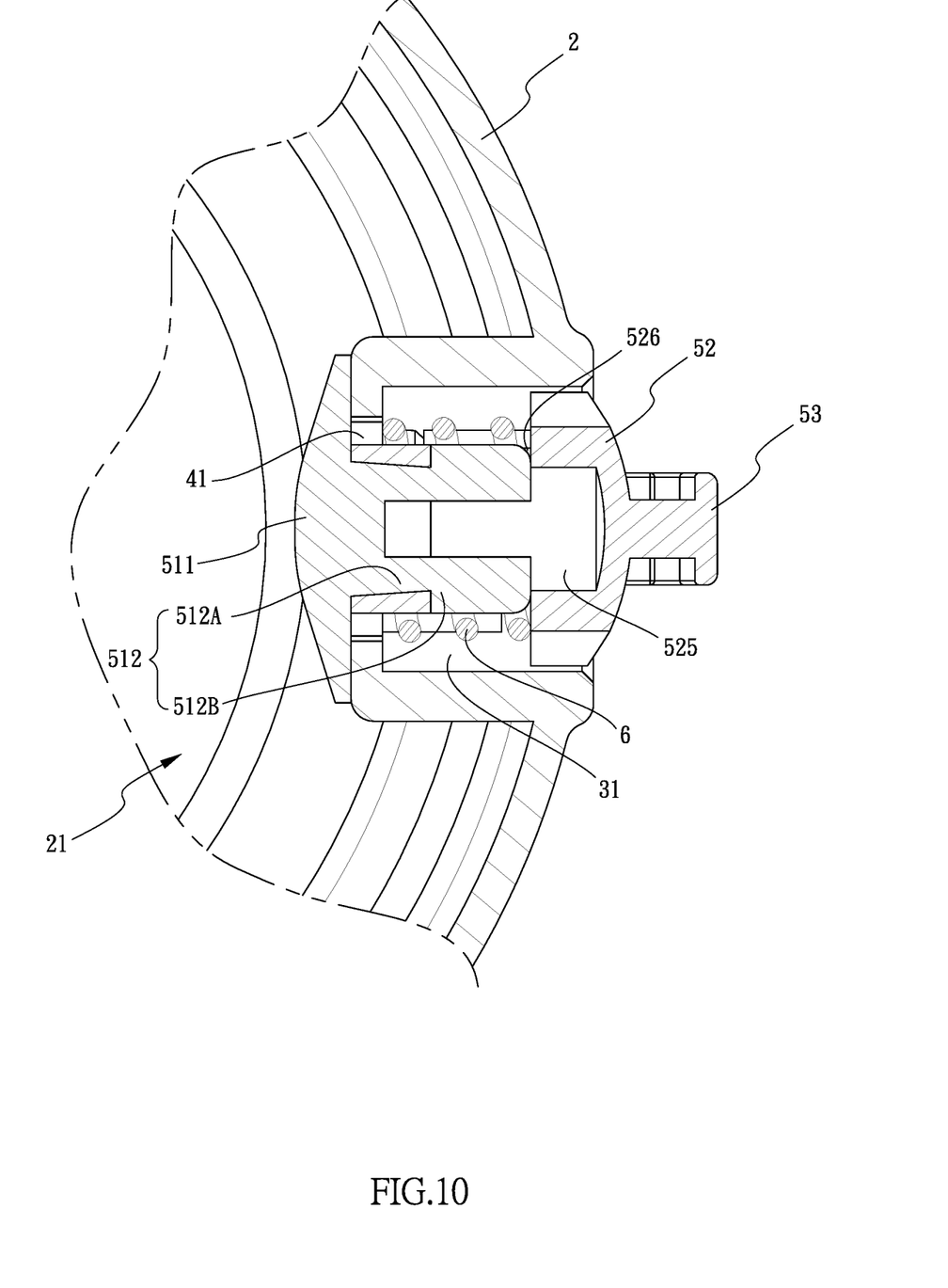
FIG. 10 is a cross sectional view, taken along line X-X of FIG. 8.
Figure 11:
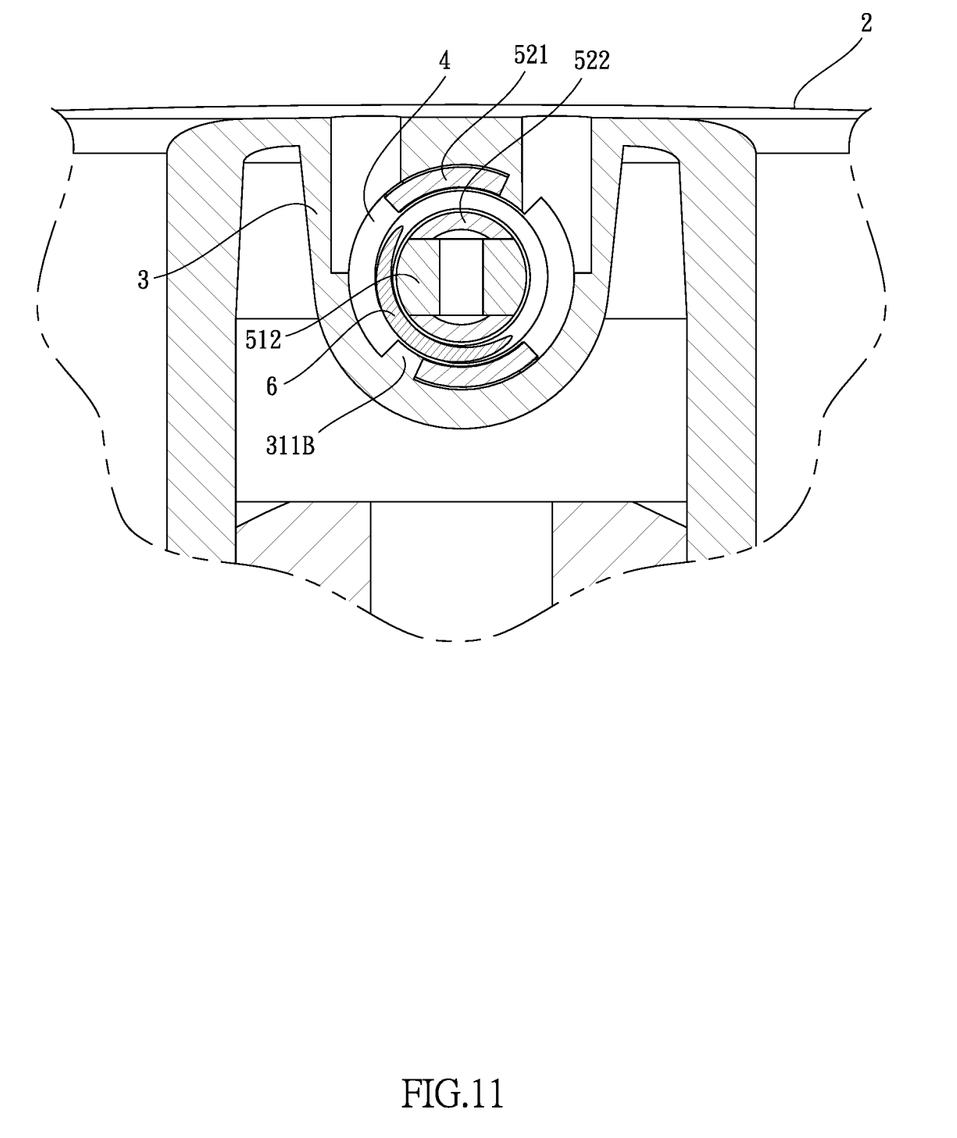
FIG. 11 is a cross sectional view, taken along line XI-XI of FIG. 8.

In order to ensure that the first room 11 of the bottle 1 communicates with outside of the bottle 1 after the control part 52 is pushed, the length "T" of each of the stop plates 521 is set to be shorter than the length "t" of the tube 522. Therefore, when the control part 52 is pushed, the distal end of the tube 522 will be protruded beyond the radial hole 31 and located in the second room 21, so that the seal part 51 does not contact the protruded portion 3 as shown in FIGS. 3 and 6A. Besides, the distance "D" from the inner periphery of the first opening of the radial hole 31 to the top of each of the protrusions 41 is set to be larger than the distance "d" from the inner periphery of the radial hole 31 to the top of each of the blocks 311. By this way, the control part 52 can be pushed and locked. As shown in FIG. 3, the radial hole 31 includes multiple air paths 22 defined radially therethrough which open through the top of the cap 2 so as to quickly balance the pressure between the interior of the bottle 1 and the exterior of the bottle 1 as shown in FIG. 6A.

The control part 52 includes a head 53 protruding from the outer side thereof. The head 53 is located beyond the second opening of the radial hole 31. The users can rotate the control part 52 by operating the head 53 to lock the control part 52.

While we have shown and described the embodiment in accordance with the present invention, it should be clear to those skilled in the art that further embodiments may be made without departing from the scope of the present invention.

What is claimed is:
1. A seal bottle assembly comprising:
a bottle having a top opening; a first room defined in the bottle and communicating with the top opening;
a cap removably mounted to the top opening of the bottle to seal the first room, the cap including a second room defined therein, a radial hole defined radially through the cap and communicating with the second room, the radial hole including a first opening located at an inner periphery of the cap, and a second opening located at an outer periphery of the cap, a restriction ring extend- ing radially and inward from an inner periphery of the first opening of the radial hole, the restriction ring including multiple protrusion protruding from an inner periphery thereof, multiple recesses defined in the inner periphery of the restriction ring, multiple blocks extending from the inner periphery of the radial hole;

a switch unit having a seal part and a control part, the control part having two stop plates and a tube extending from an inner side thereof, the stop plates located around the tube, a communication path defined between the tube and the stop plates; the stop plates and the tube of the control part inserted into the radial hole from the second opening of the outer periphery of the cap, the control part including at least one notch defined radially in an outer periphery thereof, the at least one notch communicating with the radial hole, the seal part including a tongue that is inserted into the radial hole from the first opening of the inner periphery of the cap, the tongue engaged with the tube;

when the control part is pushed toward the seal part, the tube pushes the seal part toward the second room so that the first room, the second room, the recesses, the radial hole and the at least one notch are in communication with each other; a pressure in the first and second rooms is the same as that of outside of the bottle assembly so that the cap is removable relative to the bottle; when the control part is pulled away from the seal part, the seal part is moved to seal a communication between the first and second rooms, the pressure in the first and second rooms is different from that of outside of the bottle assembly so that the cap is not removable relative to the bottle; when the control part is rotated within the radial hole, the two stop plates contact the blocks to restrict the control part from being pushed toward the seal part.

2. The seal bottle assembly as claimed in claim 1, wherein the seal part includes an end plate and the tongue extends from one side of the end plate, a diameter of the end plate is larger than that of the first opening of the radial hole, the tongue includes a lateral portion, the tube of the control part includes a central passage in which the tongue is inserted, a window is defined through a wall of the tube and communicates with the central passage, the lateral portion is engaged with the window when the tongue is inserted into the central passage of the tube.

3. The seal bottle assembly as claimed in claim 2, wherein each of the blocks is an L-shaped block and includes a first restriction portion and a second restriction portion, the first restriction portion is perpendicular to the second restriction portion corresponding thereto, the first restriction portion of each block includes an inclined face formed on a corner at a distal end thereof, the inclined face of each block guides one of the stop plates to contact the first restriction portion and the second restriction portion, the second restriction portion of each block restricts rotation of the stop plate corresponding thereto.

4. The seal bottle assembly as claimed in claim 3, wherein the radial hole includes multiple air paths defined radially therethrough which open through a top of the cap.

5. The seal bottle assembly as claimed in claim 1, wherein a spring is mounted to an outside of the tube and located in the communication path, the spring is biased between the control part and the protrusions, the spring provides a force to return the control part after the control part is pushed.

6. The seal bottle assembly as claimed in claim 1, wherein a length of each of the stop plates is shorter than a length of the tube.

7. The seal bottle assembly as claimed in claim 1, wherein a distance from the inner periphery of the first opening of the radial hole to a top of each of the protrusions is larger than a distance from the inner periphery of the radial hole to a top of each of the blocks.

8. The seal bottle assembly as claimed in claim 1, wherein the control part includes a head protruding from an outer side thereof, the head is located beyond the second opening of the radial hole.

\* \* \* \* \*